UNITED STATES PATENT OFFICE.

EDUARD ULLRICH AND MORITZ VON GALLOIS, OF HÖCHST-ON-THE-MAIN, GERMANY, ASSIGNORS TO THE FARBWERKE, VORMALS MEISTER, LUCIUS & BRUNING, OF SAME PLACE.

PROCESS OF DYEING PHENETIDIN RED.

SPECIFICATION forming part of Letters Patent No. 569,395, dated October 13, 1896.

Application filed December 26, 1893. Serial No. 494,752. (No specimens.) Patented in Germany January 17, 1892, No. 64,510; in England March 5, 1892, No. 4,407, and in France March 5, 1892, No. 219,909.

*To all whom it may concern:*

Be it known that we, EDUARD ULLRICH, doctor of philosophy, a citizen of the Empire of Germany, and MORITZ VON GALLOIS, a citizen of the Empire of Austria-Hungary, residing at Höchst-on-the-Main, in the Empire of Germany, have invented certain new and useful Improvements in the Production of a Red Color on the Fiber from Orthonitroparaphenetidin, (for which we have obtained Letters Patent in Germany, No. 64,510, dated January 17, 1892; in England, No. 4,407, dated March 5, 1892, and in France, No. 219,909, dated March 5, 1892,) of which the following is a specification.

Among the bases that are actually used in dye and print works for producing red azo colors upon naphthol-grounded fiber the principal ones are beta-naphthylamin, amidoazobenzene, paranitranilin, and others; but the colors obtained by means of these bodies are, with the exception of those produced by paranitranilin, of a very limited degree of fastness to light and soap, and the red obtained by means of paranitranilin is too yellowish— *i. e.*, too orange red—for most purposes. Since the time that azo colors were first produced on the fiber, it was therefore the general desire to find a body by means of which it should be possible to produce a red color that, besides being fast, had a bluish shade. In making experiments in this direction we discovered that the orthonitroparaphenetidin was a base which responded in every respect to the effect aimed at. The orthonitroparaphenetidin ($N_2O_2.C_6H_3.N_1H_2.O_1C_2H_5$) can be produced from phenacetin by heating the same with diluted nitric acid or by nitrating it in glacial acetic-acid solution. It melts at 103° to 104° centigrade. (*Groll Inaugural Dissertation, Bâle,* printed by Bechtold & Co., Wiesbaden, 1888, p. 20.)

The blue red that can be produced by means of orthonitroparaphenetidin is not quite so fast as that obtained by means of alizarin, but as to beauty and bluish tint of shade and also with regard to resistance against light and soap it is much above those red shades that heretofore could be produced upon the cotton fiber. The discovery of it therefore constitutes a double advantage. Not only has the still vacant space in the series of red azo colors been filled in, but at the same time it is possible to produce in dyeing and printing a relatively fast blue red of such beauty of shade as could not before be produced with any other coloring-matter.

Whereas the shades now commonly produced by means of combinations of beta-naphthylamin or amidoazo-benzene with beta-naphthol under the influence of hot-soap solutions undergo great alterations and lose in intensity, this is not the case with the novel red obtained by means of orthonitroparaphenetidin. On the contrary, it is improved by soaping, and at the same time its resistance against the influence of light, provided that it be fixed by means of turkey-red oil and aluminate of soda, is greater than that of the shades obtained by the other two combinations. The latter change in shade and turn brown red after two days' exposure to light. The method of fixing is essential for the phenetidin red to the same extent as is the case of paranitranilin red. Its beauty and fastness of shade are improved by this method.

Examples of producing the printing-color:

1. *Naphthol ground.*—One hundred and forty-five grams of beta-naphthol, two hundred and fifty cubic centimeters of soda-lye of 22° Baumé, five hundred cubic centimeters of turkey-red oil of fifty per cent., and 100 grams of aluminate of soda of twenty-five per cent. ($Al_2O_3$) in about ten liters.

2. *Diazo solution.*—18.2 grams orthonitroparaphenetidin, fifty-two cubic centimeters double nitrate solution, and fifty cubic centimeters water are brought into the form of a smooth paste and introduced slowly at a temperature of about 30° centigrade into a mixture of twenty cubic centimeters hydrochloric acid of 22° Baumé and eighty cubic centimeters water. The solution is filtered and brought to four hundred cubic centimeters.

3. *Printing-color.*—Four hundred cubic centimeters diazo solution, five hundred and fifty grams thickening, and fifty grams acetate of soda.

The fabric after grounding with naphthol is either dyed with the diazo solution No. 2 or printed with the printing-color No. 3 and soaped after drying at a temperature of 100° centigrade.

What we claim as our invention is—

The process of producing a bluish-red color in dyeing fibers, which consists in combining on the fiber orthonitroparaphenetidin with beta-naphthol to an azo compound, and fixing the color by turkey-red oil and a metallic compound, substantially as described.

In testimony that we claim the foregoing as our invention we have signed our names in presence of two subscribing witnesses.

EDUARD ULLRICH.
MORITZ VON GALLOIS.

Witnesses:
HEINRICH HAHN,
WILHELM LHAAB.